US012767766B2

(12) United States Patent
Min

(10) Patent No.: US 12,767,766 B2

(45) Date of Patent: Oct. 20, 2026

(54) METHOD OF PREPARING SUPERABSORBENT POLYMER

(71) Applicant: LG Chem, Ltd., Seoul (KR)

(72) Inventor: Ji Hong Min, Daejeon (KR)

(73) Assignee: LG Chem, Ltd., Seoul (KR)

(*) Notice: Subject to any disclaimer, the term of this patent is extended or adjusted under 35 U.S.C. 154(b) by 852 days.

(21) Appl. No.: 18/007,947

(22) PCT Filed: Nov. 23, 2021

(86) PCT No.: PCT/KR2021/017211

§ 371 (c)(1),
(2) Date: Dec. 2, 2022

(87) PCT Pub. No.: WO2022/119207

PCT Pub. Date: Jun. 9, 2022

(65) Prior Publication Data

US 2023/0272169 A1 Aug. 31, 2023

(30) Foreign Application Priority Data

Dec. 2, 2020 (KR) ........................ 10-2020-0166858
Nov. 18, 2021 (KR) ........................ 10-2021-0159519

(51) Int. Cl.

| | |
|---|---|
| ***C08J 3/075*** | (2006.01) |
| ***A61L 15/60*** | (2006.01) |
| ***B01J 20/26*** | (2006.01) |
| ***C08F 6/00*** | (2006.01) |
| ***C08F 6/26*** | (2006.01) |
| ***C08J 3/12*** | (2006.01) |
| ***C08J 3/24*** | (2006.01) |

(52) U.S. Cl.

CPC ............. *C08J 3/075* (2013.01); *B01J 20/267* (2013.01); *C08J 3/12* (2013.01); *C08J 3/245* (2013.01); *B01J 2220/68* (2013.01); *C08J 2300/14* (2013.01); *C08J 2305/00* (2013.01)

(58) Field of Classification Search

CPC ..... C08J 3/075; C08J 3/12; C08J 3/245; C08J 2300/14; C08J 2305/00; C08J 2333/02; B01J 20/267; B01J 2220/68; A61L 15/60; C08F 6/008; C08F 6/26

See application file for complete search history.

(56) References Cited

U.S. PATENT DOCUMENTS

| | | | |
|---|---|---|---|
| 5,496,933 A | 3/1996 | Kelkenberg | |
| 6,565,981 B1 | 5/2003 | Messner et al. | |
| 6,603,056 B2 | 8/2003 | Beihoffer et al. | |
| 6,765,042 B1 | 7/2004 | Thornton et al. | |
| 2003/0014027 A1 | 1/2003 | Beihoffer et al. | |
| 2003/0125684 A1* | 7/2003 | Qin | A61L 15/60 502/402 |
| 2004/0071966 A1 | 4/2004 | Inger et al. | |
| 2004/0236016 A1 | 11/2004 | Thornton et al. | |
| 2007/0207924 A1* | 9/2007 | Ikeuchi | C08J 3/245 502/402 |
| 2008/0262155 A1 | 10/2008 | Mertens et al. | |
| 2010/0063469 A1 | 3/2010 | Herfert | |
| 2013/0039822 A1 | 2/2013 | Hasan | |
| 2013/0253158 A1 | 9/2013 | Naumann et al. | |
| 2014/0158355 A1* | 6/2014 | Wuthrich | C09K 8/588 166/305.1 |
| 2015/0328358 A1 | 11/2015 | Kamphus et al. | |
| 2021/0197173 A1 | 7/2021 | Ahn et al. | |
| 2021/0322953 A1 | 10/2021 | Park et al. | |

FOREIGN PATENT DOCUMENTS

| | | | |
|---|---|---|---|
| CN | 1520425 | A | 8/2004 |
| CN | 106752099 | A | 5/2017 |
| CN | 109196023 | A | 1/2019 |
| JP | H07-096181 | A | 4/1995 |
| JP | H08-053550 | A | 2/1996 |
| JP | 2001-523733 | A | 11/2001 |
| JP | 2003033652 | A | 2/2003 |
| JP | 2004285548 | A | 10/2004 |
| JP | 2010501696 | A | 1/2010 |
| JP | 6567556 | B2 | 8/2019 |
| KR | 20010032226 | A | 4/2001 |
| KR | 20020003226 | A | 1/2002 |
| KR | 20050023224 | A | 3/2005 |
| KR | 20070007162 | A | 1/2007 |
| KR | 20120066369 | A | 6/2012 |
| KR | 101653087 | B1 | 8/2016 |
| KR | 20170085417 | A | 7/2017 |
| KR | 20170088892 | A | 8/2017 |
| KR | 20200072395 | A | 6/2020 |
| KR | 20200090672 | A | 7/2020 |
| WO | 1999-025393 | A2 | 5/1999 |
| WO | 2000-035504 | A1 | 6/2000 |

OTHER PUBLICATIONS

Fan et al., Journal of Gaofenzi Cailiao Kexue Yu Gongcheng, (2011), 27(3), 120-123.*

Dai et al., Chemical Engineering Journal, (2010), v.165, p. 240-249.*

Extended European Search Report for Application No. 21900895.0 dated Dec. 1, 2023. 8 pgs.

Odian, G. “Principles of Polymerization” John Wiley & Sons, Inc, Dec. 1981, p. 203, ISBN: 0-471-05146-2.

Schwalm, R. “UV Coatings Basics, Recent Developments and New Applications” Elsevier Science, Dec. 2006, p. 115, ISBN-13: 978-0444529794.

International Search Report for Application No. PCT/KR2021/017211 mailed Mar. 2, 2022, pp. 1-3.

* cited by examiner

*Primary Examiner* — Yong L Chu

(74) *Attorney, Agent, or Firm* — Lerner David LLP

(57) ABSTRACT

Provided is a method of preparing a superabsorbent polymer, which includes carrying out a polymerization of a water-soluble ethylene-based unsaturated monomer to form a water-containing gel polymer, and a step of pulverizing the water-containing gel polymer. In the method of preparing a superabsorbent polymer, an interpenetrating polymer network (IPN) is formed on the surface of the superabsorbent polymer during formation of a surface-crosslinked layer of the superabsorbent polymer, thereby improving physical properties of the superabsorbent polymer.

10 Claims, No Drawings

METHOD OF PREPARING SUPERABSORBENT POLYMER

CROSS-REFERENCE TO RELATED APPLICATIONS

This application is a national phase entry under 35 U.S.C. § 371 of International Application No. PCT/KR2021/017211, filed on Nov. 23, 2021, which claims priority from Korean Patent Application No. 10-2020-0166858, filed on Dec. 2, 2020, and Korean Patent Application No. 10-2021-0159519, filed on Nov. 18, 2021, the disclosures of which are hereby incorporated by reference herein in their entirety.

TECHNICAL FIELD

The present disclosure relates to a method of preparing a superabsorbent polymer, in which an interpenetrating polymer network (IPN) is formed on the surface of the superabsorbent polymer.

BACKGROUND ART

A superabsorbent polymer (SAP) is a synthetic polymeric material capable of absorbing moisture from 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used not only for hygiene products such as paper diapers for children, etc., but also for water retaining soil products for gardening, water stop materials for the civil engineering and construction, sheets for raising seedling, fresh-keeping agents for food distribution fields, materials for poultice or the like.

In most cases, these superabsorbent polymers have been widely used in the field of hygienic materials such as diapers, sanitary pads, etc. In such hygienic materials, the superabsorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the content of pulp is reduced or pulp is not used at all is being actively advanced.

As described above, in the case of hygienic materials in which the content of pulp is reduced or the pulp is not used, a superabsorbent polymer is contained at a relatively high ratio and these superabsorbent polymer particles are inevitably contained in multiple layers in the hygienic materials. In order for the whole superabsorbent polymer particles contained in the multiple layers to more efficiently absorb a liquid such as urine, etc., it is necessary for the superabsorbent polymer to basically exhibit high absorption performance and absorption rate. For this purpose, a method of crosslinking the surface of the superabsorbent polymer is used.

The surface crosslinking of the superabsorbent polymer is to form a surface-crosslinked layer by binding functional groups such as a carboxyl group, etc. present on the surface of the superabsorbent polymer, and this surface crosslinking may improve physical properties of the superabsorbent polymer. However, when the surface-crosslinked layer is formed by this method, the physical strength may increase, but the absorption rate of the superabsorbent polymer may decrease. Therefore, there is a need for a method of forming the surface-crosslinked layer without impairing the intrinsic physical properties of the superabsorbent polymer.

DISCLOSURE

Technical Problem

There is provided a method of preparing a superabsorbent polymer, in which an interpenetrating polymer network (IPN) is formed on the surface of the superabsorbent polymer during formation of a surface-crosslinked layer of the superabsorbent polymer.

Technical Solution

In order to achieve the above object, there is provided a method of preparing a superabsorbent polymer, the method including the following steps of:

1) carrying out a crosslinking polymerization of a water-soluble ethylene-based unsaturated monomer having acidic groups which are at least partially neutralized, in the presence of an internal crosslinking agent, to form a water-containing gel polymer including a first crosslinked polymer (step 1);
2) coarsely pulverizing the water-containing gel polymer (step 2);
3) drying, pulverizing, and size-sorting the water-containing gel polymer to form a base polymer powder (step 3); and
4) reacting the base polymer powder with a surface crosslinking solution to form an interpenetrating polymer network on the surface of the base polymer powder (step 4), wherein the surface crosslinking solution includes a monomer having an amine group and a compound represented by the following Chemical Formula 1:

[Chemical Formula 1]

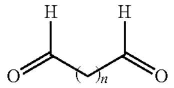

in Chemical Formula 1, n is an integer of 1 to 10.

The method of preparing a superabsorbent polymer largely includes a step of carrying out a polymerization of a water-soluble ethylene-based unsaturated monomer to form a water-containing gel polymer, and a step of pulverizing the water-containing gel polymer. Further, to improve various physical properties of the superabsorbent polymer, a method of crosslinking the surface of the prepared superabsorbent polymer is used.

Generally, the surface crosslinking of the superabsorbent polymer is formed by binding functional groups with each other, such as hydroxyl groups, etc., which are present on the surface of the superabsorbent polymer. Since the functional groups present in the superabsorbent polymer are chemically reacted, some physical properties of the superabsorbent polymer may deteriorate.

Accordingly, in the present technology, instead of the functional groups such as hydroxyl groups, etc. present on the surface of the superabsorbent polymer, a new polymer chain is introduced as an interpenetrating polymer network (IPN) on the surface of the superabsorbent polymer to form a surface-crosslinked layer. Therefore, the present technology is characterized in that the surface-crosslinked layer is formed without deteriorating the intrinsic physical properties of the superabsorbent polymer, and consequently, various physical properties of the superabsorbent polymer are improved.

Hereinafter, each step of the present technology will be described in detail.

(Step 1)

The step 1 is a step of preparing a water-containing gel polymer, and specifically, a step of forming a water-containing gel polymer by carrying out a crosslinking polymerization of a monomer composition including a water-soluble ethylene-based unsaturated monomer having acidic groups which are at least partially neutralized.

The water-soluble ethylene-based unsaturated monomer may be any monomer commonly used in the preparation of superabsorbent polymers. Specifically, the water-soluble ethylene-based unsaturated monomer may be a compound represented by the following Chemical Formula 2:

$$R^1\text{—}COOM^1 \qquad \text{[Chemical Formula 2]}$$

in Chemical Formula 2, $R^1$ is an alkyl group containing an unsaturated bond and having 2 to 5 carbon atoms, and $M^1$ is a hydrogen atom, a monovalent or divalent metal, an ammonium group, or an organic amine salt.

Preferably, the water-soluble ethylene-based unsaturated monomer may include one or more selected from the group consisting of acrylic acid, methacrylic acid, and a monovalent metal salt thereof, a divalent metal salt thereof, an ammonium salt thereof, and an organic amine salt thereof. As described, when acrylic acid or a salt thereof is used as the water-soluble ethylene-based unsaturated monomer, it is advantageous in terms of obtaining a superabsorbent polymer having improved absorbency. In addition, the monomer may include one or more selected from the group consisting of an anionic monomer such as maleic anhydride, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methylpropane sulfonic acid, and a salt thereof; a nonionic hydrophilic monomer such as (meth)acrylamide, N-substituted (meth) acrylate, 2-hydroxyethyl(meth)acrylate, 2-hydroxypropyl (meth)acrylate, methoxypolyethyleneglycol(meth)acrylate, or polyethyleneglycol(meth)acrylate; and an unsaturated monomer containing an amino group such as (N,N)-dimethylaminoethyl(meth)acrylate or (N,N)-dimethylaminopropyl(meth)acrylamide, and a quaternary compound thereof.

The water-soluble ethylene-based unsaturated monomer may have an acidic group, in which at least a part of the acidic group is neutralized. Preferably, those partially neutralized with an alkaline substance such as sodium hydroxide, potassium hydroxide, ammonium hydroxide or the like may be used as the monomer.

In this regard, the degree of neutralization of the monomer may be 40 mol % to 95 mol %, or 40 mol % to 80 mol %, or 45 mol % to 75 mol %. The range of the degree of neutralization may vary depending on the final physical properties. An excessively high degree of neutralization causes the neutralized monomers to be precipitated, and thus polymerization may not readily occur. On the contrary, an excessively low degree of neutralization not only deteriorates the absorbency of the polymer but also endows the polymer with hard-to-handle properties, like elastic rubber.

The monomer composition may include a polymerization initiator commonly used in the preparation of superabsorbent polymers.

As the polymerization initiator, a thermal polymerization initiator, a photopolymerization initiator or the like may be used depending on the polymerization method. However, even in the case of the photopolymerization method, a certain amount of heat is generated by ultraviolet irradiation, etc., and a certain amount of heat is generated in accordance with the progression of the polymerization reaction, which is an exothermic reaction, and therefore, a thermal polymerization initiator may be further included.

The photopolymerization initiator may include, for example, one or more compounds selected from the group consisting of benzoin ether, dialkyl acetophenone, hydroxyl alkyl ketone, phenyl glyoxylate, benzyl dimethyl ketal, acyl phosphine, and α-aminoketone. Among them, as a specific example of the acylphosphine, a commercially available lucirin TPO, i.e., 2,4,6-trimethyl-benzoyl-trimethyl phosphine oxide may be used. More various photopolymerization initiators are well disclosed in "UV Coatings: Basics, Recent Developments and New Application (Elsevier, 2007)" written by Reinhold Schwalm, p 115, the content of which is incorporated herein by reference.

As the thermal polymerization initiator, one or more compounds selected from the group consisting of a persulfate-based initiator, an azo-based initiator, hydrogen peroxide, and ascorbic acid may be used. Specific examples of the persulfate-based initiator may include sodium persulfate ($Na_2S_2O_8$), potassium persulfate ($K_2S_2O_8$), ammonium persulfate ($(NH_4)_2S_2O_8$), etc. In addition, examples of the azo-based initiator may include 2,2-azobis(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane]dihydrochloride, 4,4-azobis-(4-cyanovaleric acid), etc. More various thermal polymerization initiators are well disclosed in "Principle of Polymerization (Wiley, 1981)" written by Odian, p 203, the content of which is incorporated herein by reference.

The polymerization initiator may be included at a concentration of about 0.001% by weight to about 1% by weight, or 0.005% by weight to about 0.1% by weight, based on the monomer composition. In other words, when the concentration of the polymerization initiator is too low, the polymerization rate may become slow and a large amount of residual monomer may be extracted in the final product, which is not preferred. On the contrary, when the concentration of the polymerization initiator is too high, polymer chains constituting the network become short, and thus the content of water-soluble components is increased and physical properties of the polymer may deteriorate, such as a reduction in absorbency under pressure, which is not preferred.

Meanwhile, the polymerization of the monomer composition may be carried out in the presence of a crosslinking agent ("internal crosslinking agent") in order to improve physical properties of the polymer by polymerization of the water-soluble ethylene-based unsaturated monomer. The crosslinking agent is used for internal crosslinking of the water-containing gel polymer, and may be used, separately from "a surface crosslinking agent" described below.

The internal crosslinking agent may be any compound, as long as it enables introduction of crosslinking during the polymerization of the water-soluble ethylene-based unsaturated monomer. As non-limiting examples of the internal crosslinking agent, multifunctional crosslinking agents such as N,N'-methylenebisacrylamide, trimethylolpropane tri (meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentaacrylate, glycerin tri(meth)acrylate, pentaerythritol tetraacrylate, triallylamine, allyl(meth)acrylate, ethylene glycol diglycidyl ether, propylene glycol, glycerin, or ethylene carbonate may be used alone or in combination of two or more thereof.

The internal crosslinking agent may be added at a concentration of 0.001% by weight to 1% by weight, or 0.01% by weight to 0.8% by weight, or 0.1% by weight to 0.7% by weight, based on the monomer composition. In other words, when the concentration of the internal crosslinking agent is too low, the absorption rate of the polymer is lowered and gel strength may become weak, which is not preferred. On the contrary, when the concentration of the internal crosslinking agent is too high, the absorption capacity of the polymer is lowered, which is not preferred for an absorbent.

In addition, crosslinking polymerization of the monomer composition may be carried out in the presence of a foaming agent, depending on the need and degree of improvement of the absorption rate. This foaming agent is decomposed during the crosslinking polymerization reaction to generate gas, and therefore, pores may be formed inside the water-containing gel polymer. As a result, when such a foaming agent is additionally used, a more developed porous structure is formed inside the superabsorbent polymer, and the absorption rate of the superabsorbent polymer may be further improved.

Non-limiting examples of the foaming agent may include one or more compounds selected from the group consisting of sodium bicarbonate, sodium carbonate, potassium bicarbonate, potassium carbonate, calcium bicarbonate, calcium carbonate, magnesium bicarbonate, magnesium carbonate, azodicarbonamide (ADCA), dinitroso pentamethylene tetramine (DPT), p,p'-oxybis(benzenesulfonyl hydrazide) (OBSH), p-toluenesulfonyl hydrazide (TSH), sucrose stearate, sucrose palmitate, and sucrose laurate.

The foaming agent may be preferably present in an amount of 1000 ppmw to 4000 ppmw, and more specifically, in an amount of 1000 ppm or more, or 1100 ppmw or more, or 1200 ppmw or more; and 4000 ppmw or less, or 3500 ppmw or less, or 3000 ppmw or less in the monomer composition.

In addition, the monomer composition may further include additives such as a thickener, a plasticizer, a preservation stabilizer, an antioxidant, etc., as needed.

Such monomer composition may be prepared in the form of a solution in which raw materials, such as the above-described water-soluble ethylene-based unsaturated monomer, polymerization initiator, internal crosslinking agent, foaming agent, etc., are dissolved in a solvent.

In this regard, as the applicable solvent, any solvent may be used without limitations in the constitution as long as it is able to dissolve the above raw materials. For example, as the solvent, water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof may be used.

Formation of the water-containing gel polymer through polymerization of the monomer composition may be carried out by a common polymerization method, and a process thereof is not particularly limited.

For non-limiting example, the polymerization method is largely classified into thermal polymerization and photopolymerization according to a polymerization energy source. The thermal polymerization may be carried out in a reactor like a kneader equipped with agitating spindles. The photopolymerization may be carried out in a reactor equipped with a movable conveyor belt.

For example, the monomer composition is injected to the reactor like the kneader equipped with the agitating spindles, and thermal polymerization is carried out by providing hot air thereto or by heating the reactor, thereby obtaining the water-containing gel polymer. In this regard, the water-containing gel polymer may be obtained as particles having a size of centimeters or millimeters when it is discharged from an outlet of the reactor, according to the type of agitating spindles equipped in the reactor. Specifically, the water-containing gel polymer may be obtained in various forms according to a concentration of the monomer composition fed thereto, a feeding speed or the like, and the water-containing gel polymer having a (weight average) particle size of 2 mm to 50 mm may be generally obtained.

For another example, when the monomer composition is subjected to photopolymerization in the reactor equipped with the movable conveyor belt, the water-containing gel polymer may be obtained in a sheet-type. In this regard, the thickness of the sheet may vary according to the concentration of the monomer composition fed thereto and the feeding speed. The sheet is preferably controlled to have a thickness of 0.5 cm to 10 cm in order to assure the production speed while allowing the entire sheet to be uniformly polymerized.

The water-containing gel polymer formed by the method may exhibit a water content of 40% by weight to 80% by weight. The water content, as used herein, means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the drying conditions may be determined as follows: the drying temperature is increased from room temperature to about 180° C. and then the temperature is maintained at 180° C., and the total drying time is set to 20 minutes, including 5 minutes for the temperature rising step.

(Step 2)

The step 2 of the present technology is a step of gel-pulverizing the water-containing gel polymer prepared in the previous step 1.

The pulverizing may increase the drying efficiency of the water-containing gel polymer, and may also influence morphology of the superabsorbent polymer, thereby influencing various physical properties of the superabsorbent polymer, such as absorption rate. In particular, to improve the absorption rate of the superabsorbent polymer, the present technology includes a step of pulverizing the water-containing gel polymer before drying. In order to distinguish this pulverizing from the pulverizing of the step 4 to be described below, it may be referred to as the term ‘coarsely pulverizing’ for convenience in the present technology.

A pulverizer used for the pulverizing is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited to the above-described examples.

In this regard, the step of coarsely pulverizing may be carried out such that a particle size of the water-containing gel polymer becomes about 2 mm to about 10 mm. Pulverizing of the water-containing gel polymer into a particle size of less than 2 mm is not technically easy due to its high water content, and an agglomeration phenomenon between the pulverized particles may occur. Meanwhile, when the polymer is pulverized into a particle size of greater than 10 mm, the effect of increasing the efficiency in the subsequent step of drying may be insignificant.

(Step 3)

The step 3 of the present technology is a step of drying, pulverizing, and size-sorting the gel-pulverized water-containing gel polymer of the step 2 to form a base polymer powder.

The drying may be carried out at a temperature of 120° C. to 250° C., or 140° C. to 200° C., or 150° C. to 190° C. In this regard, the drying temperature may be defined as a temperature of a heating medium provided for drying, or an internal temperature of a drying reactor including the heating medium and the polymer during the drying process. If the drying temperature is low, and therefore, the drying time becomes long, the process efficiency may be decreased. In order to prevent this problem, the drying temperature is preferably 120° C. or higher. In addition, when the drying temperature is higher than necessary, the surface of the water-containing gel polymer is excessively dried, and thus there is a concern about generation of fine particles during the subsequent pulverization process and deterioration of the physical properties of a final polymer. In order to prevent this problem, therefore, the drying temperature is preferably 250° C. or lower.

In this regard, the drying time in the drying step is not particularly limited, but may be controlled to 20 minutes to 90 minutes at the above drying temperature, in view of process efficiency and physical properties of the polymer.

The drying may be carried out by using a general medium, and for example, the pulverized water-containing gel polymer may be supplied with hot air, or irradiated with infrared rays, microwaves, ultraviolet rays, or the like.

The drying as above is performed such that the dried polymer may preferably have the water content of about 0.1% by weight to about 10% by weight. In other words, when the water content of the dried polymer is less than 0.1% by weight, production costs may be increased and degradation of the crosslinked polymer may undesirably occur due to excessive drying. When the water content of the dried polymer is more than 10% by weight, defects may occur in the subsequent process, which is not preferred.

Subsequently, the dried water-containing gel polymer may be pulverized. This is a step of optimizing the surface area of the base polymer powder and the superabsorbent polymer. The pulverization may be carried out such that the particle size of the pulverized polymer is 150 μm to 850 μm.

A pulverizer applicable herein may include a pin mill, a hammer mill, a screw mill, a roll mill, a disc mill, a jog mill, or the like which is commonly used.

In order to manage physical properties of the superabsorbent polymer finally produced, a step of selectively size-sorting particles having a particle size of 150 μm to 850 μm from the polymer particles obtained through the pulverization step may be further carried out.

The base polymer powder may be obtained through the above-described size-sorting process. The base polymer powder thus obtained may have a particle size of 150 μm to 850 μm, and may include fine powder having a particle size of less than 150 μm in an amount of 2% by weight or less, or 1% by weight or less.

(Step 4)

The step 4 of the present technology is a step of reacting the base polymer powder prepared in the step 3 with a surface crosslinking solution to form an interpenetrating polymer network on the surface of the base polymer powder.

In particular, the present technology is characterized by forming an interpenetrating polymer network (IPN) on the surface of the superabsorbent polymer. To this end, the surface crosslinking solution is characterized by including a monomer having an amine group and a compound represented by Chemical Formula 1.

The compound represented by Chemical Formula 1 includes an aldehyde group in its chemical structure, and thus it is reacted with the monomer having an amine group on the surface of the base polymer powder to form an interpenetrating polymer network, and consequently, a surface-crosslinked layer may be formed.

Preferably, the monomer having an amine group is chitosan, or cyclodextrin. The cyclodextrin means that the amine group is substituted.

Preferably, a solvent of the surface crosslinking solution may be water, methanol, cyclohexane, or a combination thereof, and most preferably, water may be used. The solvent may be used in an amount of 5 parts by weight to 50 parts by weight, based on 100 parts by weight of the base polymer powder.

Preferably, pH of the surface crosslinking solution is 1 to 3. In the above pH range, the reaction of chitosan and the compound represented by Chemical Formula 1 may be effectively induced. The pH may be adjusted using an acidic material without limitation. For example, hydrochloric acid, sulfuric acid, etc. may be used.

Preferably, a concentration of chitosan in the surface crosslinking solution is 1 N to 10 N. In addition, a concentration of the compound represented by Chemical Formula 1 is preferably 1 N to 10 N.

Preferably, a weight ratio of the chitosan and the compound represented by Chemical Formula 1 in the surface crosslinking solution is 1:1 to 5:1, and more preferably 1:1 to 3:1.

Preferably, n in Chemical Formula 1 is 2 to 4. More preferably, n in Chemical Formula 1 is 3. In other words, the compound represented by Chemical Formula 1 is preferably glutaraldehyde.

In addition, the surface crosslinking solution may include an inorganic filler. The inorganic filler may include silica, aluminum oxide, or silicate. The inorganic filler may be included in an amount of 0.01 part by weight to 0.5 parts by weight, based on 100 parts by weight of the base polymer powder.

Further, the surface crosslinking solution may further include a thickener. When the surface of the base polymer powder is further crosslinked in the presence of the thickener, it is possible to minimize the deterioration of the physical properties even after the pulverization. Specifically, as the thickener, one or more selected from polysaccharides and a hydroxy-containing polymers may be used. The polysaccharides may include gum-type thickeners, cellulose-type thickeners, etc. Specific examples of the gum-type thickeners include xanthan gum, arabic gum, karaya gum, tragacanth gum, ghatti gum, guar gum, locust bean gum, psyllium seed gum, etc. Specific examples of the cellulose-type thickeners include hydroxypropylmethyl cellulose, carboxymethyl cellulose, methylcellulose, hydroxymethyl cellulose, hydroxyethyl cellulose, hydroxypropyl cellulose, hydroxyethylmethyl cellulose, hydroxymethylpropyl cellulose, hydroxyethylhydroxypropyl cellulose, ethylhydroxyethyl cellulose, methylhydroxypropyl cellulose, etc. Meanwhile, specific examples of the hydroxy-containing polymer may include polyethylene glycol, polyvinyl alcohol, etc.

Meanwhile, in the step 4, a method of placing the surface crosslinking solution and the base polymer in a reaction tank and mixing them, a method of spraying the surface crosslinking solution onto the base polymer, a method of mixing the base polymer and the surface crosslinking solution while continuously feeding them to a mixer which is continuously operated, etc. may be used.

The step 4 may be carried out at a temperature of 20° C. to 90° C. Further, the step 4 may be carried out for 10 minutes to 24 hours.

(Superabsorbent Polymer)

Further, the present technology provides a superabsorbent polymer prepared according to the above-described preparation method of the present technology.

The superabsorbent polymer includes a base polymer powder including a crosslinked polymer of a water-soluble ethylene-based unsaturated monomer having acidic groups which are at least partially neutralized; and a surface-crosslinked layer which is formed on the base polymer powder and includes an interpenetrating polymer network. Further, the superabsorbent polymer is obtained as particles having a particle size of 150 μm to 850 μm.

Further, the superabsorbent polymer has excellent CRC and gel strength.

As used herein, the term "CRC (Centrifugal Retention Capacity)" is also called water retention capacity, and refers to an amount of a solution absorbed under no load. The CRC may be measured in accordance with EDANA WSP 241.3, and a specific measurement method will be described in Example below. Preferably, CRC of the superabsorbent polymer is 30 g/g to 40 g/g. More preferably, CRC of the superabsorbent polymer is 30.5 g/g or more, 31.0 g/g or more, 31.5 g/g or more, or 32.0 g/g or more, and 39 g/g or less, 38 g/g or less, 37 g/g or less, 36 g/g or less, or 35 g/g or less.

As used herein, the term "gel strength" refers to a degree to which absorbency and water retention capacity of the superabsorbent polymer are maintained even under an external pressure, in other words, a degree to which the superabsorbent polymer maintains its shape well even after absorbing water. A specific method of measuring the gel strength will be described in Example below. Preferably, the gel strength of the superabsorbent polymer is 1.50 N to 3.00 N. More preferably, the gel strength of the superabsorbent polymer is 1.55 N or more, 1.60 N or more, 1.65 N or more, or 1.70 N or more, and 2.90 N or less, 2.80 N or less, 2.70 N or less, 2.60 N or less, 2.50 N or less, 2.40 N or less, 2.30 N or less, 2.20 N or less, 2.10 N or less, or 2.00 N or less.

Effect of the Invention

As described above, a method of preparing a superabsorbent polymer according to the present technology is characterized in that an interpenetrating polymer network is formed on the surface of the superabsorbent polymer during formation of a surface-crosslinked layer of the superabsorbent polymer, thereby improving physical properties of the superabsorbent polymer.

DETAILED DESCRIPTION OF THE EMBODIMENTS

Hereinafter, preferred exemplary embodiments are provided for better understanding of the present technology. However, the following exemplary embodiments are only for illustrating the present technology, and the present technology is not limited thereto.

Preparation Example: Preparation of Base Polymer 20.5 g (80 ppm) of 0.21% IRGACURE 819 initiator diluted with 500 g of acrylic acid was mixed, and 21 g of a 10% polyethylene glycol diacrylate (PEGDA, Mw=400) solution diluted with acrylic acid was injected to the mixed solution, and 12 g of a 2% SDS(Sodium dodecyl sulfate) solution was mixed therewith, and 800 g of a 24% caustic soda solution was slowly added dropwise thereto, followed by mixing. As a water-soluble ethylene-based unsaturated monomer thus obtained, acrylic acid had a degree of neutralization of 70 mole % in sodium acrylate.

After confirming that the temperature of the mixture increased to 72° C. or higher by neutralization heat generated upon mixing the two solutions, when the temperature was cooled to 43° C., 13.4 g of 4% sodium bicarbonate was mixed, and 16 g of 4% sodium persulfate solution diluted with water was injected at the same time.

The solution was poured in a tray (15 cm in width×15 cm in length) installed in a square polymerizer which had a UV irradiation device installed at the top and was preheated to 80° C., and polymerization was initiated by UV irradiation. A sheet-type polymer thus prepared was cut in a size of 5 cm×5 cm, and then injected to a meat chopper to pulverize the polymer. Thus, water-containing particles having a size of 1 mm to 10 mm were obtained.

The crumbs were dried in an oven capable of shifting airflow up and down. The crumbs were uniformly dried by flowing hot air at 180° C. or higher from the bottom to the top for 15 minutes and from the top to the bottom for 15 minutes. After drying, the dried product had a water content of 2% or less. After drying, the product was pulverized using a pulverizer and sorted by size, and a size of about 150 to about 850 um was selected to prepare a base polymer.

Example 1

Chitosan (0.05 g) and glutaraldehyde (0.025 mL) were added to a 0.1 N HCl aqueous solution (10 ml), and stirred to prepare a surface crosslinking solution.

The surface crosslinking solution was sprayed onto 100 g of the base polymer prepared in Preparation Example, and uniformly mixed, and then a reaction was allowed at 25° C. for 40 minutes to prepare a superabsorbent polymer.

Examples 2 to 4 and Comparative Examples 1 and 2

Each superabsorbent polymer was prepared in the same manner as in Example 1, except that the composition of the surface crosslinking solution was changed as in Table 1, below.

Experimental Example

Physical properties of the superabsorbent polymers prepared in Examples and Comparative Examples were measured by the following methods, respectively.

1) CRC

Centrifuge retention capacity by absorbency under no load was measured for each polymer according to EDANA WSP 241.3.

In detail, from the polymers of Examples and Comparative Examples, each polymer size-sorted using #30-50 sieve was obtained. Each polymer $W_0$(g) (about 2.0 g) was uniformly placed into a nonwoven-fabric-made bag, followed by sealing. Then, the bag was immersed in a physiological saline solution (0.9% by weight) at room temperature. After 30 minutes, the bag was drained at 250 G for 3 minutes with a centrifuge, and the weight $W_2$(g) of the bag was then measured. Further, the same procedure was carried out using no polymer, and the resultant weight $W_1$(g) was measured. Thus, CRC (g/g) was calculated from the obtained weights according to the following Equation:

$$CRC(g/g)=\{[W_2(g)-W_1(g)]/W_0(g)\}-1 \quad \text{[Equation 1]}$$

2) Gel Strength

From the polymers of Examples and Comparative Examples, each polymer size-sorted using #30-50 sieve was obtained, and 1 g thereof was weighed. The weighed samples were sufficiently immersed and swelled in 100 g of a physiological saline solution for 1 hour. Thereafter, the solvent not absorbed therein was removed by using an aspirator for 4 minutes, and the solvent left on the surface of the same was evenly distributed and wiped once with a filter paper.

2.5 g of the swelled superabsorbent polymer was positioned between two plates (a diameter of 25 mm, with a wall of about 2 mm at the bottom for preventing the sample from leaking) of a rheometer, and the gap between the two plates was adjusted to 1 mm (At this time, when the sample is hard and thus it is difficult to adjust the gap to 1 mm, the gap between the plates was properly adjusted by pressing the plates with a force of about 3 N such that the swelled superabsorbent polymer sample was contacted evenly at the face of the plates).

Subsequently, the superabsorbent polymer sample between the plates was stabilized for about 5 minutes.

Thereafter, a linear viscoelastic regime section of strain where the storage modulus (G') and the loss modulus (G") are steady was found by using the rheometer while increasing the strain at frequency of 10 rad/s. Generally, in the case of a swollen superabsorbent polymer, a strain of 0.1% was imparted in the linear regime section, and viscoelastic properties (G', G") of the swollen polymer are measured using the strain value of the linear regime section at a constant frequency of 10 rad/s for 60 seconds. The obtained G' values were averaged to obtain the gel strength.

The measurement results are shown in Tables 1 and 2 below.

TABLE 1

| | 0.1N HCl solution | Chitosan | Glutaraldehyde | CRC (g/g) | Gel strength (N) |
|---|---|---|---|---|---|
| Ex. 1 | 10 mL | 0.05 g | 0.025 mL | 35.9 | 1.73 |
| Ex. 2 | 30 mL | 0.10 g | 0.050 mL | 34.4 | 1.96 |
| Ex. 3 | 30 mL | 0.05 g | 0.025 mL | 35.2 | 1.77 |
| Ex. 4 | 10 mL | 0.10 g | 0.050 mL | 34.3 | 1.84 |

TABLE 2

| | Water | Ethylene carbonate | Propylene carbonate | Polycarboxylate salt | Aluminum sulfate | CRC (g/g) | Gel strength (N) |
|---|---|---|---|---|---|---|---|
| Comparative Ex. 1 | 4.4 mL | 0.3 g | (none) | 0.07 g | 0.3 g | 39.9 | 0.56 |
| Comparative Ex. 2 | 5.4 mL | 0.9 g | 0.9 g | (none) | 0.2 g | 36.4 | 1.68 |

As shown in Tables 1 and 2, the superabsorbent polymers of Examples 1 to 4 according to the present technology showed the similar levels of CRC, but showed the increased gel strength, as compared with the superabsorbent polymers of Comparative Examples 1 and 2. The superabsorbent polymers of Comparative Examples 1 and 2 also had the surface-crosslinked layer of a network structure by surface crosslinking, but the superabsorbent polymers of Examples 1 to 4 according to the present technology had a structure in which, in addition to the network structure, additional crosslinking occurred, and thus another network structure was formed, thereby having the improved gel strength.

The invention claimed is:

1. A method of preparing a superabsorbent polymer, the method comprising:

1) Carrying out a crosslinking polymerization of a water-soluble ethylene-based unsaturated monomer having acidic groups which are at least partially neutralized, in the presence of an internal crosslinking agent, to form a water-containing gel polymer including a first cross-linked polymer;

2) Coarsely pulverizing the water-containing gel polymer;

3) Drying, pulverizing, and size-sorting the water-containing gel polymer to form a base polymer powder; and 4) Reacting the base polymer powder with a surface crosslinking solution to form an interpenetrating polymer network on a surface of the base polymer powder, wherein the surface crosslinking solution includes a monomer having an amine group and a compound represented by Chemical Formula 1:

[Chemical Formula 1]

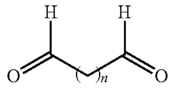

in Chemical Formula 1, n is an integer of 1 to 10, wherein a concentration of the compound represented by Chemical Formula 1 in the surface crosslinking solution is 1 N to 10 N, and wherein the reacting the base polymer powder with a surface crosslinking solution is carried out at a temperature of 20° C. to 90° C.

2. The method of claim 1, wherein a solvent of the surface crosslinking solution is water.

3. The method of claim 1, wherein a pH of the surface crosslinking solution is 1 to 3.

4. The method of claim 1, wherein the monomer having an amine group is chitosan or cyclodextrin.

5. The method of claim 1, wherein a concentration of the monomer having an amine group in the surface crosslinking solution is 1 N to 10 N.

6. The method of claim 1, wherein a weight ratio of the chitosan and the compound represented by Chemical Formula 1 in the surface crosslinking solution is 1:1 to 5:1.

7. The method of claim 1, wherein n of Chemical Formula 1 is an integer of 2 to 4.

8. The method of claim 1, wherein the compound represented by Chemical Formula 1 is glutaraldehyde.

9. The method of claim 1, wherein a CRC of the superabsorbent polymer is 30 g/g to 40 g/g.

10. The method of claim 1, wherein a gel strength of the superabsorbent polymer is 1.50 N to 3.00 N.

* * * * *